US005565994A

United States Patent [19]
Eschbach

[11] Patent Number: 5,565,994
[45] Date of Patent: Oct. 15, 1996

[54] MULTIPLE SEPARATION ERROR DIFFUSION, WITH CROSS SEPARATION CORRELATION CONTROL FOR COLOR IMAGES

[75] Inventor: Reiner Eschbach, Webster, N.Y.

[73] Assignee: Xerox Corporation, Stamford, Conn.

[21] Appl. No.: 350,365

[22] Filed: Dec. 6, 1994

[51] Int. Cl.$^6$ .............. H04N 1/40; H04N 1/46; H04N 1/56; H04N 1/62
[52] U.S. Cl. .......... 358/298; 358/515; 358/518; 358/530; 358/534
[58] Field of Search .................. 358/298, 515, 358/518, 530, 533, 534; 382/162, 167, 251, 252

[56] References Cited

U.S. PATENT DOCUMENTS

| | | | |
|---|---|---|---|
| 4,149,194 | 4/1979 | Holladay | 358/283 |
| 4,485,397 | 11/1984 | Scheuter et al. | 358/283 |
| 4,876,611 | 10/1989 | Fischer et al. | 358/456 |
| 5,014,123 | 5/1991 | Imoto | 358/75 |
| 5,045,952 | 9/1991 | Eschbach | 358/447 |
| 5,070,413 | 12/1991 | Sullivan et al. | 358/534 |
| 5,210,602 | 5/1993 | Mintzer | 358/518 |
| 5,223,953 | 6/1993 | Williams | 358/456 |
| 5,225,915 | 7/1993 | Ciccone et al. | 358/454 |
| 5,226,094 | 7/1993 | Eschbach | 382/41 |
| 5,226,096 | 7/1993 | Fan | 358/252 |
| 5,245,678 | 9/1993 | Eschbach et al. | 358/455 X |
| 5,268,724 | 12/1993 | Koizumi et al. | 355/274 |
| 5,278,670 | 1/1994 | Eschbach | 358/453 |
| 5,325,211 | 6/1994 | Eschbach | 382/252 |
| 5,353,127 | 10/1994 | Shian et al. | 358/458 |
| 5,375,002 | 12/1994 | Kim et al. | 358/530 X |

OTHER PUBLICATIONS

An Adaptive Algorithm for Spatial Greyscale; Floyd et al.; Proceedings of the SID, 17/2, 75–77 (1976).
Analytic Description of the 1–D Error Diffusion Technique for Halftoning; Optics Communications; vol. 52; No. 3; Eschbach et al; 1984; pp. 165–168.
On the Error Diffusion Technique for Electronic Halftoning; Billotet–Hoffmann et al; Proceedings of the SID, vol. 24/3; 1983; pp. 253–258.
Images from Computers; M. R. Schroeder; IEEE Spectrum; pp. 66–78; 1969.
Binarization Using a Two–Dimensional Pulse–Density Modulation; Eschbach et al; J. Opt. Soc. Am.; A/vol. 4; No. 10/Oct. 1987; 1873–1878.
Pulse–Density Modulation on Rastered Media: Combining Pulse–Density Modulation and Error Diffusion; Eschbach; J. Opt. Soc. Am. A/vol. 7, No. 4/Apr. 1990; 708–716.

*Primary Examiner*—Peter S. Wong
*Assistant Examiner*—Eric Frahm
*Attorney, Agent, or Firm*—Mark Costello

[57] ABSTRACT

An image processing system for preparing a document for printing which receives multi separation color documents for printing, each discrete area or pixel in the image described by a signal having a number of possible states greater than can be rendered by a selected printer. In such a system, each separation of the image is separately processed with an error diffusion process which takes into account the processing of another separation, if any. Output signals from a separation are used to determine threshold values for at least one other separation. The varying thresholds are used to vary the likelihood of the current pixel being a spot or no spot.

29 Claims, 4 Drawing Sheets

MULTIPLE SEPARATION ERROR DIFFUSION, WITH CROSS SEPARATION CORRELATION CONTROL FOR COLOR IMAGES

This invention relates to quantization or halftoning in color documents, and more particularly to the use of error diffusion in multiple separation color documents.

CROSS REFERENCE

Cross reference is made to and priority is claimed from U.S. patent application Ser. No. 08/306,299 entitled "Error Diffusion Halftoning with Homogeneous Response in High/ Low Intensity Image Regions" by R. Eschbach, filed Sep. 15, 1994, and assigned to the same assignee as the present application; and U.S. patent application Ser. No. 08/144,478 entitled "Method and Apparatus for Vector Error Diffusion with Output Color Control" by R. V. Klassen et al, filed Nov. 2, 1993, and assigned to the same assignee as the present application.

BACKGROUND OF THE INVENTION

Color in documents is the result of a combination of a limited set of colors over a small area, in densities selected to integrate to a desired color response. This is accomplished in many printing devices by reproducing separations of the image, where each separation provides varying density of a single primary color. When combined together with other separations, the result is a full color image.

In the digital reproduction of documents, a separation is conveniently represented as a monochromatic bitmap, which may be described as an electronic image with discrete signals (hereinafter, pixels) defined by position and density. In such a system, density is described as one level in a number of possible states or levels. When more than two levels of density are used in the description of the image, the levels are often termed "gray", indicating that they vary between a maximum and minimum, and without reference to their actual color. Most printing systems have the ability to reproduce an image with a small number of levels, most commonly two, although other numbers are possible. Common input devices including document scanners, digital cameras and the computer imagery generators, however, are capable of describing an image with a substantially larger number of gray levels, with 256 levels a commonly selected number, although larger and smaller levels are possible. It is required that an image initially described at a large set of levels also be describable at a smaller set of levels, in a manner which captures the intent of the user. In digital reproduction of color documents this means that each of the color separations is reduced from the input number of levels to a smaller output number of levels. The multiple color separations are combined together at printing to yield the final color print. Commonly, color documents are formed using cyan, magenta and yellow colorants or cyan, magenta, yellow and black colorants. A larger number or alternative colorants may also be used.

In printing documents,, the desired density of color over an area is commonly achieved by halftoning, where separation density variation is represented by placing greater or less numbers of ON pixels in a discrete area of a separation. In one halftoning method known as dithering or screening, over a given area having a number of gray separation pixels therein, a value representing the density of each separation pixel of an array of gray separation pixels within the area is compared to one of a set of preselected thresholds (the thresholds are stored as a dither matrix and the repetitive pattern generated by this matrix is considered a halftone cell) as taught, for example, in U.S. Pat. No. 4,149,194 to Holladay. The effect of such an arrangement is that, for an area where the image is gray, some of the thresholds within the dither matrix will be exceeded, i.e. the image value at that specific location is larger than the value stored in the dither matrix for that same location, while others are not. In the binary case, the separation pixels or cell elements for which the thresholds are exceeded might be printed as a maximum colorant value, while the remaining separation pixels are allowed to remain white, dependent on the actual physical quantity described by the data. The described halftoning method produces an output pattern that is periodic or quasi-periodic in the spatial coordinates.

Error diffusion is another halftoning method and is taught in "An Adaptive Algorithm for Spatial Greyscale" by Floyd and Steinberg, Proceedings of the SID 17/2, 75–77 (1976) (hereinafter, "Floyd and Steinberg"). Another, more elaborate method would be the error diffusion techniques of U.S. Pat. No. 5,045,952 to Eschbach, which serves to provide image dependent edge enhancement, assigned to the same assignee as the present invention. Error diffusion attempts to maintain gray by making the conversion from gray pixels to binary or other level pixels on a pixel-by-pixel basis. The procedure examines each pixel with respect to a threshold, and the difference between the gray level pixel value and the output value is forwarded to a selected group or set of neighboring pixels, in accordance with a weighting scheme. The output binary pattern of the error diffusion algorithm and its derivatives is a pattern with a local periodicity related to the input density level, but with no global periodicity, see "Analytic Description of the 1-D Error Diffusion Technique for Halftoning," Optics Communications, Vol. 52, No. 3, 165–168 (1984) by R. Eschbach and R. Hauck.

Other error diffusion methods include, "On the Error Diffusion Technique for Electronic Halftoning" by Billotet-Hoffmann and Bryngdahl, Proceedings of the SID, Vol. 24/3, (1983), pp. 253–258; and U.S. Pat. No. 5,226,094 to Eschbach. A technique related to error diffusion is taught in the MAE (Minimum Average Error) method of error diffusion described in "Images from Computers", by M. Schroeder, IEEE Spectrum, March 1969, pp. 66–78, in which an error correction is performed that only affects a local neighborhood. This method does not preserve the gray density. One particularly effective error diffusion variant is taught in co-pending U.S. patent application Ser. No. 08/167,758, filed Dec. 15, 1993, entitled "Method for Quantization Gray Level Pixel Data with Extended Distribution Set", by J. Shiau and Z. Fan, U.S. Pat. No. 5,353,127.

Dithering creates problems in color document reproduction where the repeating pattern of a screen through the image, when superposed over similar repeating patterns in multiple separations, can cause moiré or other artifacts, particularly in printing systems with less than ideal registration between separations. U.S. Pat. No. 4,149,194 to Holladay. addresses this problem to some extent by providing rotated screens which tend to reduce, although not eliminate moiré.

Error diffusion, because it operates on a pixel-by-pixel basis is non-periodic, which mitigates the problems of moiré. However, since error diffusion is a deterministic process, misregistration of the different deterministic color separations can lead to a color shift. This color shift can be reduced by introducing a random element into the error diffusion process, but at the expense of image noise.

All of the references cited herein are incorporated by reference for their teachings.

SUMMARY OF THE INVENTION

In accordance with the invention, there is provided a method of preparing a multi separation color document for printing, by processing each separation with an error diffusion process that takes into account a previously processed separation.

In accordance with one aspect of the invention there is provided an image processing system for preparing a document for printing which receives multi separation color documents for printing, each discrete area or pixel in the image described by a signal having a number of possible states greater than can be rendered by a selected printer. In such a system, each separation of the image is separately processed with an error diffusion process which takes into account the processing of a prior separation, if any. Output signals from a separation are used to determine threshold values for at least one other separations.

In accordance with one aspect of the invention, there is provided an image processing system for preparing a document for printing which receives multi separation color documents for printing, each discrete area or pixel in the image described by a signal having a number of possible states greater than can be rendered by a selected printer. In such a system, each separation of the image is processed, with an error diffusion process which takes into account the processing of a prior separation, if any. For an input image so comprised, initially, an image signal in a separation is initially modified in accordance with previously determined error for a set of neighboring pixels in the separation. Output signal information is passed between separations to selectively control likelihood of whether the pixel in the current separation will exceed the threshold. In addition to this control, however, the increase or decrease in the threshold level is optionally based upon a regional input intensity or any other measure as described for example in U.S. Pat. No. 5,045,952 to R. Eschbach, U.S. Pat. No. 5,268,774 to R. Eschbach, U.S. Pat. No. 5,325,211 to R. Eschbach or U.S. patent application Ser. No. 08/306,299 entitled "Error Diffusion Halftoning with Homogeneous Response in High/Low Intensity Image Regions" by R. Eschbach, filed Sep. 15, 1994, U.S. Pat. No. 5,530,019. With the threshold signal set as described, the modified input signals is evaluated, and an output signal that is one of d levels is determined accordingly. Subsequent to quantization, the difference between the determined output signal and the modified input signal is evaluated and stored as error, to be dispersed for addition to a preselected group of unevaluated neighboring signals in the same separation.

BRIEF DESCRIPTION OF THE DRAWINGS

These and other aspects of the invention will become apparent from the following descriptions to illustrate a preferred embodiment of the invention read in conjunction with the accompanying drawings in which.

DETAILED DESCRIPTION OF THE PREFERRED EMBODIMENT

Figure 1:
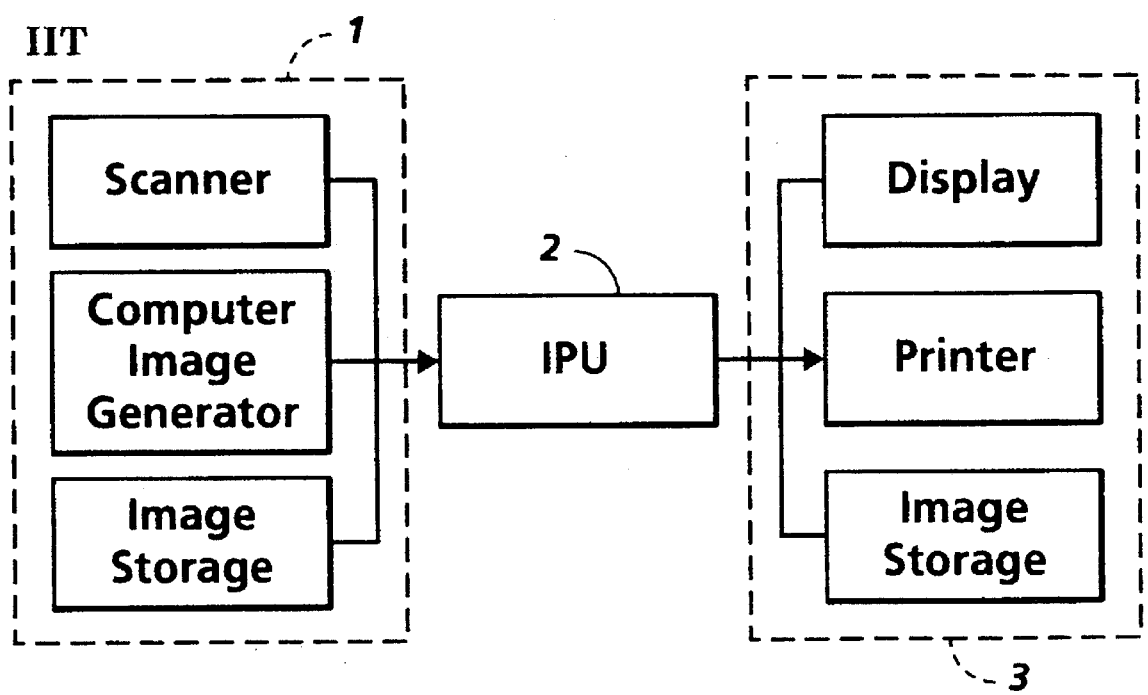
FIG. 1 is a simplified description of a system in which the present invention may find advantageous use.

Referring now to the drawings where the showings are for the purpose of describing an embodiment of the invention and not for limiting same, a basic image processing system is shown in FIG. 1. In the present case, gray image data may be characterized as image signals, each pixel of which is defined at a single level or optical density in a set of 'c' optical density levels, the number of members in the set of levels being larger than desired. Each pixel will be processed in the manner described hereinbelow, to redefine each pixel in terms of a new, smaller set of 'd' levels. In this process, 'c' and 'd' are integer values representing pixel depth, or a number of signal levels at which the pixel may appear. One common case of this method includes the conversion of data from a relatively large set of gray levels to one of two legal or allowed binary levels for printing in a binary printer.

As used herein, a "pixel" refers to an image signal associated with a particular position in an image, having a density between a minimum and a maximum. Accordingly, pixels are defined by intensity and position. In the particular color system to be discussed, color documents are represented by multiple sets of image signals, each set (or separation) represented by an independent channel, which is usually processed independently. A "color image" as used herein is therefore a document including at least two separations, such as in the Xerox 4850 Highlight Color Printer and commonly three or four separations, such as in the Xerox 4700 Color Laser Printer or the Xerox 5775 Digital Color Copier, or sometimes more than 4 separations. One possible digital copier (a scanner/printer combination) is described for example, in U.S. Pat. No. 5,014,123, incorporated herein by reference. Each separation provides a set of image signals or separation pixels which will drive a printer to produce one color separation of the image. In the case of multicolor printers, the separations, superposed together, form the color image. In this context, we will describe pixels as discrete image signals, which represent optical density of the document image in a given small area thereof. The term "separation pixel" will be used to refer to such an image signal in each separation, as distinguished from "color pixel", which is the sum of the color densities of corresponding pixels in each separation. "Gray", as used herein does not refer to a color unless specifically identified as such. Rather, the term refers to image signals which vary between maximum and minimum, irrespective of the color of the separation in which the signals are used.

With reference now to FIG. 1, which shows a general system requirement representing the goal of the invention, an electronic representation of a document (hereinafter, an image) from image input terminal such as scanner 10 derives electronic digital data in some manner, in a format related to the physical characteristics of the device, and commonly with pixels defined at m bits per pixel. Common color scanners, such, for example, Xerox 5775 Digital Color Copiers, or the Pixelcraft 7650C, produce 8 bit/pixel data, at resolutions acceptable for many purposes. Since this is a color document, the image is defined with two or more separation bitmaps, usually with identical resolution and pixel depth. The electronic image signals are directed through an image processing unit (IPU) 16 to be processed so that an image suitable for reproduction on image output terminal or printer 20 is obtained. Image processing unit 16 commonly includes a halftone processor 18 which converts m bit digital image signals to n bit digital image signals, suitable for driving a particular printer, where m and n are integer values.

Before entering into a description of an embodiment of the invention, the principle of the invention will be discussed. In the inventive color error diffusion process herein described, a color image is processed using one color separation at a time, i.e. for scanline of the image, the red separation of scanline 'n' is processed, followed by the green separation of scanline 'n' and the blue separation of scanline 'n'. Errors generated in the red component are only calculated with respect to the red component and only diffused into future pixels of the red component. The same holds true for the other separations.

In order to understand the concept behind the cross-separation correlation control using threshold imprints, initially, the threshold imprint method will be described as it can be used to influence the output state clustering of an individual separation. The concept is then extended to allow the threshold imprints to be transferred between different color separations.

A simple way to discourage the clustering of like pixels (color or white) is to raise the threshold when a white pixel is set, and to lower the threshold when a color pixel is set. This in itself, however, is not sufficient to generate a homogeneous pulse distribution. Rather the raising or lowering of the threshold has to change the probability of color/white pixels in accordance with the local input value, i.e., a white pixel in a region of ¼ intensity should reduce the possibility of another white pixel being set for 3 neighboring pixels, and a white pixel in a region of ⅒ intensity should reduce the possibility for 9 neighboring pixels. While this simple approach has value, large areas would have to be stored during processing, with its problems of implementation.

An efficient way to generate a threshold imprint over a 2-dimensional area is to generate a 1-dimensional imprint along the scanline when the scanline is processed. When processing the next scanline, the dampened threshold array of the previous scanline is used as the initial threshold values for the current scanline. The dampening guarantees, that the effect of an imprint is lost/dampened over a number of scanlines, so that the relationship is given by:

$$\text{threshold}(n,l) = D \times \text{threshold}(n,l-1)$$

where

D is the dampening coefficient

It should be noted, that this threshold array is subsequently modified during processing by the imprints generated in the current scanline.

So far, only the method of generating a 2-dimensional threshold imprint from a 1-dimensional imprint has been described, but no explanation has been given for the exact form of each individual imprint. As mentioned, it is desirable that the imprint influences a neighboring area as a function of the local intensities, i.e., an imprint for a white pixel in an area of ⅒ intensity should influence an area of 9 neighboring pixels in the next separation. In order to make the imprint influence a larger or smaller area dependent on input level, one can make the size and form of the imprint be a function of intensity. Here, size refers to the physical size in pixels of the imprint and form refers to the actual form of the imprint within that size. For instance, an imprint can have a size of 10 pixels in the form of a gaussian. As an alternate method, one can make the strength of the imprint a function of the intensity, keeping size and form constant. This means that the strength of the imprint for a white pixel in an intensity of ⅒ is larger than the strength of the imprint for a white pixel at intensity ⅕. Inside the process, this is done by multiplying the imprint template by a number taken from a table that is dependent on the local intensity. For simplicity, the preferred method uses only current input intensity as indication of the local intensity. This means, that the different imprints vary in amplitude, but not in size or form.

Based on a symmetry argument, white pixels in dark regions can be treated as equivalent to color pixels in a light region, one time using the white pixel to raise the threshold to make white pixels (i.e., same pixels) less likely, the other time using the color pixel to lower the threshold to make color pixels (i.e. same pixels) less likely. For an ideal system, the strength of an imprint can be set such that the change caused by a white pixel at intensity ⅒ will be the same as the strength of an imprint caused by a color pixel at intensity ⁹⁄₁₀, however, with different signs. In this way, only one table of imprint strengths has to be stored for both color and white imprints combined. This means:

amplitude(white,input)=-amplitude(color, max_input-input).

Some other conditions can be applied to the threshold imprint strengths:

1. The imprints should be strong in the very dark/light regions, but should vanish for mid-gray regions, where standard error diffusion techniques have good performance.

This requirement guarantees, that the good performance of error diffusion in the midtones is maintained and that the modifications only take effect in the areas where error diffusion leads to a unpleasant dot structure. It is achieved by two different ways in the current implementation. First, since the imprint amplitude for a white pixel at 50% input intensity is oppositely equal to the imprint amplitude of a white pixel at 50% input intensity, the subsequent imprints cancel one another. Secondly, it is also achieved by simply using an imprint strength of "~0" in the midtones.

2. For all inputs, the threshold imprints should result in a stable 2-dimensional threshold imprint array that does not grow beyond bounds.

A simple way to guarantee the stability of the threshold imprints is to use positive and negative negative imprints. As an example consider a dark area with very few white pixels. At the location of the white pixel a threshold imprint is created, locally increasing the thresholds. For every color pixel generated the threshold is reduced again, using only a weak imprint, i.e. a color pixel set in a dark area will very slightly lower the threshold in the neighborhood to increase the probability of a white pixel. This bi-polar imprinting opens an easy way to guarantee stability of the threshold imprints by making the amplitudes of color pixels and white pixels in the same input intensity region functions of one another. For an intensity of ⅒, we expect 1 white pixel for every 9 color pixels. In this case, the amplitude of the imprint of an individual color pixel is ⅑th the amplitude of the imprint of an individual white pixel, again with opposing signs. For an intensity of ⅕, with 1 white and 4 color pixels, the amplitude of the color imprint is ¼th the amplitude of the white imprint, etc. This form of bi-polar imprints introduces an additional symmetry for the imprint amplitudes namely:

amplitude(white,input)=-amplitude(color, max_input-input) =(input/(max_input-input))×amplitude(white, max_input-input)

where the first two terms are equal based on the color/white symmetry and the last two terms are equal based on the bi-polar form of imprinting.

All other parts of the standard error diffusion algorithm remain unchanged. The examples shown use the identical error diffusion weights as suggested by Floyd and Steinberg. Also, modifications like U.S. Pat. No. 5,045,952 and others are straightforward to implement in conjunction with the invention, as are modifications of the error calculation and weight allocation taught, for example, in U.S. patent application Ser. No. 07/672,987 (with a counterpart application published in Japan at JP-A14-328957), entitled "Method for Image Conversion with Application of Multiple Error Diffusion Matrices", by Eschbach, U.S. Pat. No. 4,924,322 to Kurosawa et. al., U.S. Pat. No. 4,339,774 to Temple, U.S. Pat. No. 4,955,065, to Ulichney and U.S. patent application Ser. No. 08/167,758 by Shiau et al.

The threshold modification described above, allows the control of the output pixel distribution for an individual separation. A corresponding scheme can be used to control the correlation between different separations.

Figure 2:
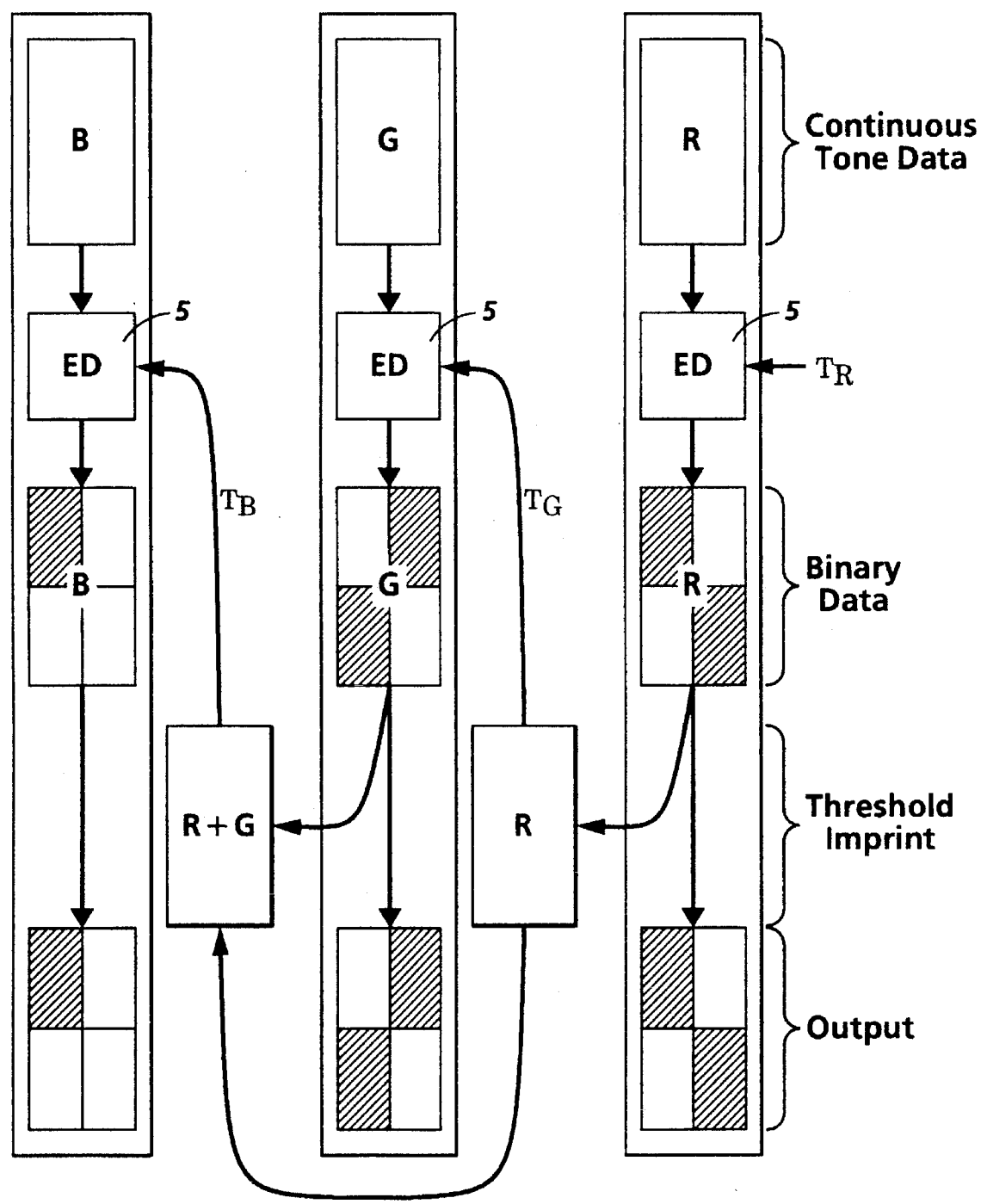
FIG. 2 is a block diagram of a color document halftoning circuit in which the invention is implemented.

Correlation control between separations is obtained by generating a threshold imprint of the output of one component (a separation scan line) and by using this threshold imprint in the decision making or thresholding process of the next separation. For example, in a display red, green, blue color space (RGB) where the possible output states in each separation are 'ON', i.e.: red, green, or blue, or 'OFF', i.e. black, FIG. 2 graphically illustrates the proposed algorithm. It will be appreciated that other color spaces can be used like cyan, magenta, yellow color space (CMY) with the corresponding 'on'-states in this case being cyan, magenta, yellow, and black, and the 'off'-state being white.) In this example, the red component is binarized first, perhaps using a standard error diffusion circuit 5, perhaps with a constant threshold $T_R$. This quantization process generates binary data for the red separation which is sent to an output device. Simultaneously, an output of the red component binarization process is used to generate a threshold imprint for the threshold of the green component '$T_G$' defined as:

$$T_G(m,n) = \begin{pmatrix} T_R(m,n) + \alpha & \text{if red\_output}(m,n) = \text{off} \\ T_R(m,n) + \beta & \text{if red\_output}(m,n) = \text{on,} \end{pmatrix}$$

where $\alpha>0$ and $\beta<0$ is chosen to correlate the separations 'in-phase', by increasing the threshold in the next separation if a pixel was not set, and by decreasing it if a pixel was set; and $\alpha<0$ and $\beta>0$ is chosen to correlate the separations 'out-of-phase', by increasing the threshold in the next separation if a pixel was set, and by decreasing it if a pixel was not set.

Table 1 shows the results of applying the algorithm with different settings to a constant color. In this case, a three color red, green, blue system was employed. For this system, "black": is represented by a "Zero State", i.e.: no separation is set. "Red", "green" and "blue" are represented by a "One State", i.e.: only one separation was set. "Cyan", "magenta" and "yellow" are represented by "Two States", i.e.: two separations are set simultaneously for one pixel. "White" is represented by "Three States", i.e.: all three separations are set for the pixel. From Table 1 it can be seen that the out-of-phase case $\alpha<0$ and $\beta>0$, contains very few pixels that have more than one separation set into the 'on' state. In the RGB examples, this means that the pixels are mainly 'red', 'green', 'blue', and 'black', with very few 'cyan', 'magenta', 'yellow', and 'white' pixels. It can also be seen from Table 1 that the in-phase case $\alpha>0$ and $\beta<0$, contains a very high number of pixels that have all three separations set in the 'on' state. The 'random' case has an intermediate position. It should be noted that the random correlation with $\alpha=0$ and $\beta=0$ is not truly random, but influenced by the correlation of the input data. A truly random correlation could be obtained by using randomized $\alpha$ and $\beta$.

TABLE 1

|  | Correlation | Zero States | One State | Two States | Three States |
| --- | --- | --- | --- | --- | --- |
| FIG. 2a $\alpha < 0, \beta > 0.$ | out-of-phase | 77 | 323 | 0 | 0 |
| FIG. 2b $\alpha = 0, \beta = 0$ | random | 149 | 181 | 66 | 4 |
| FIG. 2c $\alpha > 0, \beta < 0$ | in-phase | 261 | 49 | 2 | 88 |

The described method offers a simple way to influence the interseparation correlations in error diffusion. This is done by using the output of one separation to determine the threshold for the next separation. So far, only simple point operations on the output were used in order to vary the inter-separation correlations from an in-phase correlation to an out-of-phase correlation.

The ability to control the inter-separation correlations has advantages in at least two distinct areas:

First, in Thermal-Ink-Jet devices, the amount of ink at any pixel location should be controlled in order to reduce ink running and paper curl. Here it is important to note, that a "One State" pixel has 100% ink coverage, whereas "Two States" and "Three States" pixels exhibit a 200% and 300% ink coverage respectively. The out-of-phase inter-separation correlation minimizes the output pixels with high ink coverage (see Table 1) and thereby reduces the likelihood of ink running.

Second, in color printing applications, the inks or toners used for printing are non-ideal insofar that the absorption spectra of the different inks/toners are partially overlapping. Depending on the actual correlation between the different color separations, color shift occurs. This can be minimized using a random, or quasi-random correlation, as it can be achieved using rotated dot schemes. In active algorithms, such as error diffusion, however, the proper color stability is often obtained by adding noise to the system, so that the different separations do not correlate in phase over a relatively large area and then out-of-phase for the next area. Adding noise, however, reduces the overall image quality of the output. Allowing the inter-separation correlation control enables a control of the pixel overlaps and consequently reduces color shifts.

Figure 3:
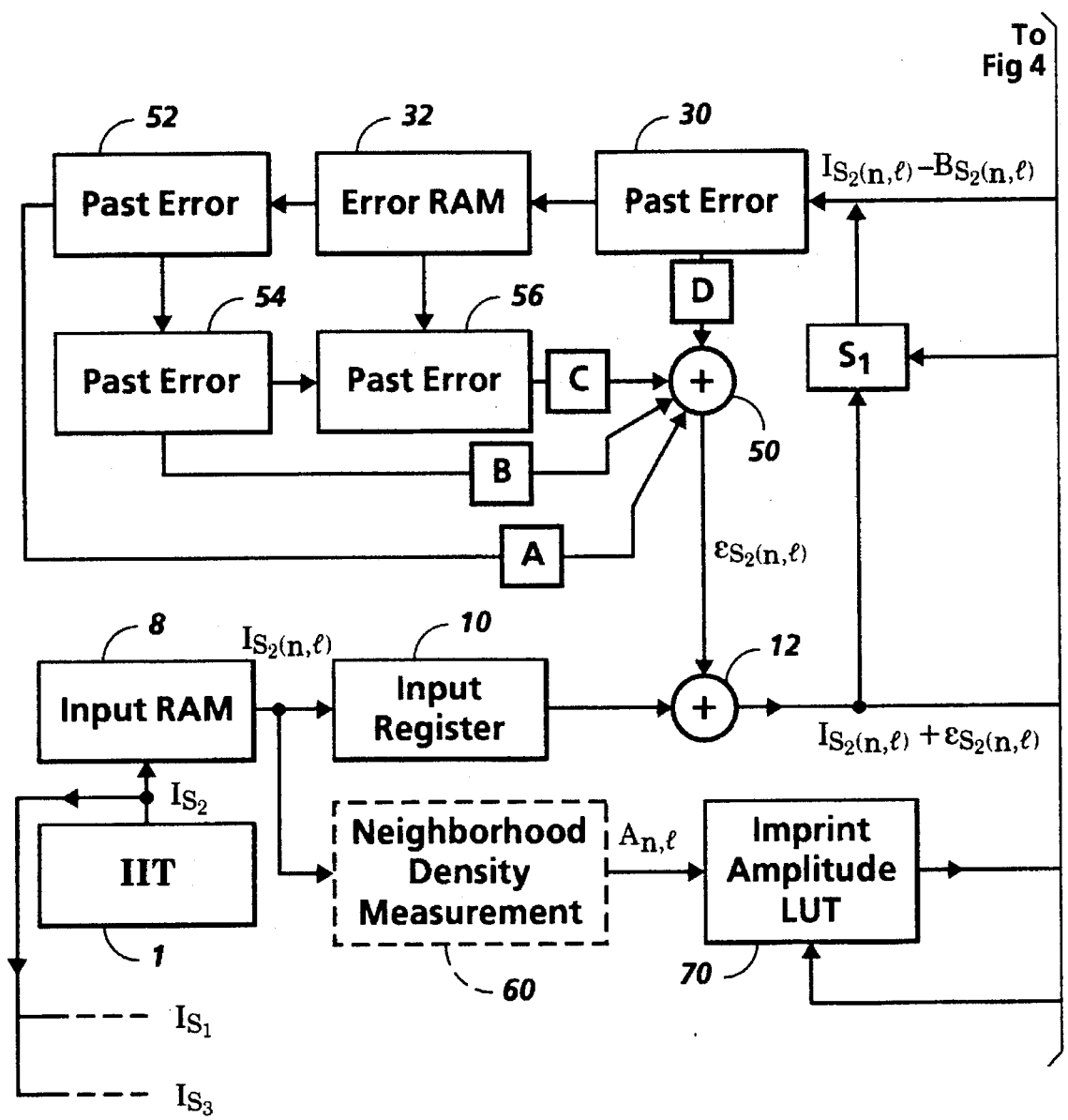
FIGS. 3 and 4 together show an error diffusion circuit useful in the present invention.
Figure 4:
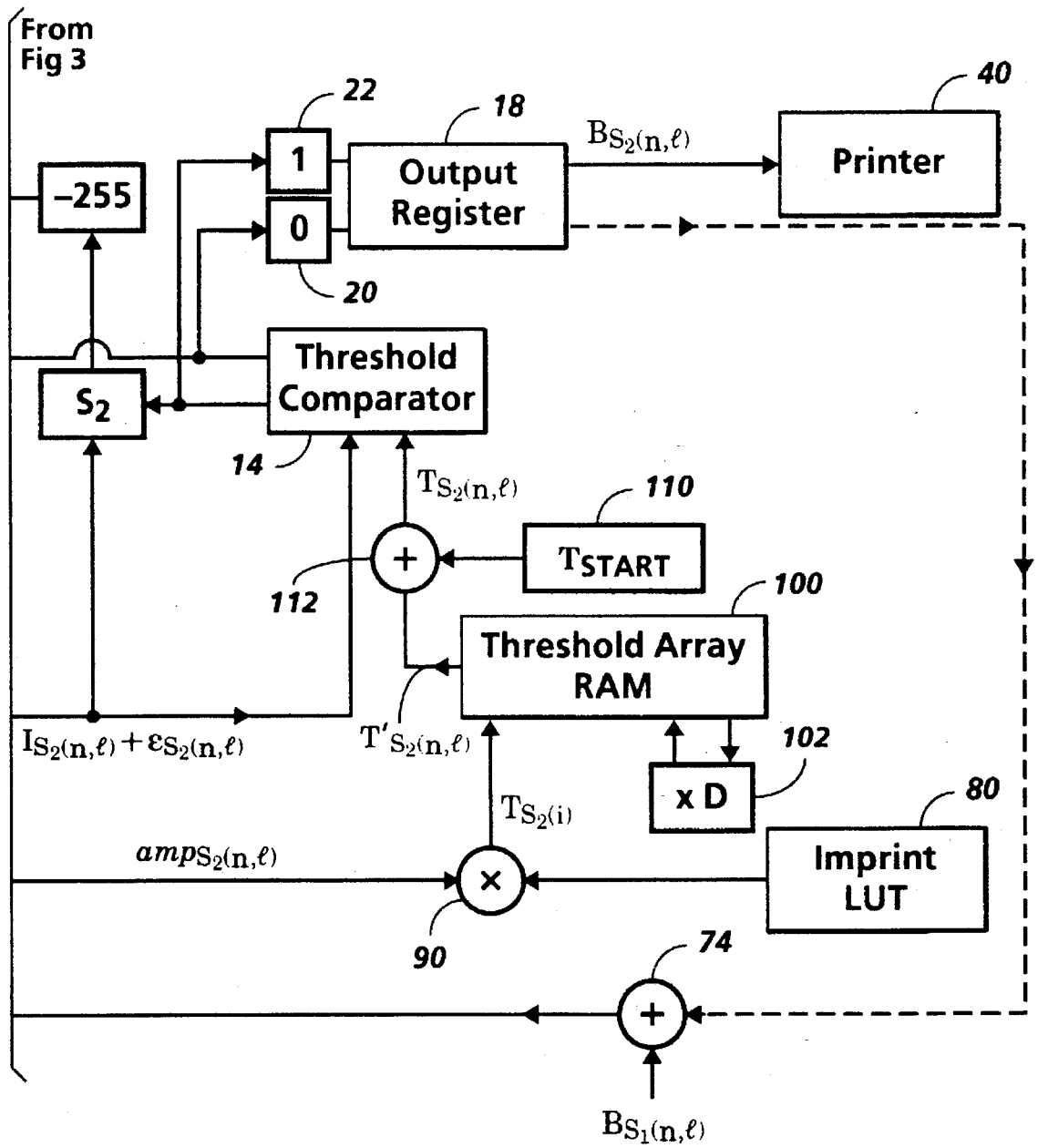

FIGS. 3 and 4 together illustrate a possible implementation of the error diffusion potion of this invention. There may be a number of error diffusion circuits corresponding to the number of separations to be processed, or there may be a single circuit which is used plural times for plural separations. The present embodiment assumes the former. Thus, for a three color system essentially identical circuits S1, S2 (shown) and S3 are provided. A stored array of input image signals representing a single separation $I_{S2}$ stored at input RAM 8, which may be from any image input device 1 operated in accordance with suitable driver software or computer generated representations, directs input image $I_{S2}$ into the system on a signal by signal basis, where n,l represents the position of a single separation image signal $I_{S2}(n,l)$ in a stream of image signals. Such gray level signals or pixels, generally defined as multi bit or N bit values, which defines $2^N$ or 'c' possible levels of optical density. Initially, a single signal $I_{S2}(n,l)$ is stored front input RAM or other storage device 8 suitable for holding a portion of image $I_{S2}$ to an input register 10 which is a storage device suitable for storing such a multi-bit signal. Each input signal, stored at input register 10, has a corresponding error correction signal $\epsilon$ added to the image signal I at signal adder 12 where $I_{S2}(n,l)$ is a sum of weighted error term signals of previous pixels to be added to $I_{S2}(n,l)$, resulting in a modified image signal. The modified image signal, the sum of the input image signal and the error correction signal of previous pixels $(I_{S2}(n,l)+\epsilon_{S2}(n,l))$, is passed to threshold comparator 14, where it is compared to the threshold signal T generated in accordance with the invention, to determine the corresponding output state $d_i$, where the drawing shows the case for two output states $d_1$ and $d_2$ for simplicity, although more output levels are possible. States $d_1$ and $d_2$ correspond to an appropriate output signal $B_{S2}(n,l)$ for pixel $I_{S2}(n,l)$, such as, for example, for a binary output printing system, a spot or no spot. Responsive to this comparison, if the signal $I_{S2}(n,l)+\epsilon_{S2}(n,l)$ is greater than the reference, then an image signal representing a single "set" or colored spot is directed to output register 18 from RAM memory 22. If responsive to this comparison, signal $I_{S2}(n,l)+\epsilon_{S2}(n,l)$ is less than the reference, then an image signal representing a single black spot is directed to output register 18 from memory 20. If a black pixel is directed to output register 18, switch S2 is enabled to allow tile modified input image signal $I_{S2}(n,l)+\epsilon_{S2}(n,l)$ to be stored to error register 30 without alteration. If a set pixel is directed to output register 18, switch S2 is enabled to allow the modified input image signal $I_{S2}(n,l)+\epsilon_{S2}(n,l)$ to be stored to error register 30, after having a value equal to set (255 in the 8 bit case) subtracted from the signal. Pixels stored to output register 18 are eventually directed to output device 3. In the present case, where $I_{S2}$ represents a single separation of an image, with or without further correlation processing, the separation may be printed at a color printer such as the Xerox 5775 Digital Color, the Xerox 4700 Color Printer, or the Hewlett Packard 1200C Ink Jet Color Printer.

Error determined in the quantization of pixels is stored at error RAM 32, until an image signal which requires the addition of error passes through the system. Then, the portion of the stored errors from previous quantization is directed to adder 50 from past error registers 52, 54, 56 and error register 30. Error registers 52, 54, 56 are connected to allow the error signal to be shifted from register to register as a line of data is directed through the described system. Error signals are directed through multipliers A, B, C and D, respectively, in accordance with Floyd and Steinberg type error diffusion, with a weighting scheme selected as desired. Note that the use of four error signals is for illustrative purposes only and that lesser or larger numbers might be used in the actual implementation. Signal adder 50 produces signal $\epsilon_{S2}(n, l)$ to be added to $I_{S2}(n, l)$, resulting in a modified image signal. The modified image signal, the sum of the input image signal and the error correction signal of previous pixels is given by $(I_{S2}(n,l)+\epsilon_{S2}(n,l))$. Note also the weighting function described in U.S. patent application Ser. No. 08/167,758 by Shiau et al. filed Dec. 15, 1993, which could be directly substituted into this arrangement.

Returning to FIGS. 3 and 4, neighborhood density measurement 60, produces a measurement of image density over an area of the image separation $I_{S2}$ and operates on measured density to produce a signal $A_{S2}(n,l)$ reflecting how strongly the threshold will be changed. For simplicity, this area can be optionally reduced to encompass only the current pixel. This is an optional step which is not always necessary. Preferably, the neighborhood density measurement effects only that portion of the threshold setting process which is attributable to tile current separation.

At imprint amplitude LUT 70, the signal $A_{S2}(n,l)$ is used, together with the signals from The output registers 18 of the current and the previous separation (in our case, from separation $S_2$ and $S_1$) as an index to a table of imprint amplitude values to generate an amplitude signals $amp_{S2}(n, l)$. In an example case, the signals from output register 18 of S2 and $S_2$ are simply added, for example at adder 74, however, this is not required. In cases where no spot control from the current separation is used, only the signal from output register 18 of the previous separation is used.

At imprint LUT 80, imprints are stored for use in the system. Typically, there will be a series of digitally stored values that determine the form of the actual imprint by giving the relative imprint amplitude levels along with an indication of the imprint center:

Template: {0.05, 0.25, 0.55, 0.75, 0.9, 1.0, 1.1, 1.0, 0.75, 0.55, 0.25, 0.05} where 1.1 is the center pixel. Several different implementations can be used to define the imprint center pixel. In symmetric imprints, the first pixel can be designated center pixel and out previous template would be stored as:

Template: {1.1, 1.0, 0.75, 0.55, 0.25, 0.05}

In such a case, all pixels (n+i,l) with positive indices i are taken directly from the table, whereas all pixels (n+i,l) with negative indices i use the absolute value of i as an index into the table.

An alternate method is to designate a specific table value to define the center of the imprint. Using a designated value of 1.0 for the center, the original template rounded to two decimals would be stored as:

Template: {0.05, 0.23, 0.5, 0.68, 0.82, 0.91, 1.0, 0.91, 0.82, 0.68, 0.5, 0.23, 0.05}

Another alternate method would use the center pixel of the imprint LUT as the center of the imprint.

Signals obtained from imprint LUT 80 are multiplied by signals from the imprint amplitude LUT 70, at signal multiplier 90, to produce threshold correction signals $T_i$. Signals $T_i$ are added to the threshold signals T'(n,l) in threshold array 100.

Threshold Array RAM 100 is initially cleared and the first pixel threshold T(1,1) is generated by adding the threshold to the first element of the threshold array T'(1,1) RAM 100 to the initial threshold $T_{start}$ from RAM 110 at adder 112. The first output pixel B(1,1) is generated using threshold T(1,1), setting the output register 18. In response to imprint amplitude LUT 70, an imprint is generated via imprint LUT 80 and multiplier 90, changing the first element of the threshold array T'(1,1). Assuming, for illustrative purposes, the threshold imprints $T_i=T_{-2},T_{-1}, T_0, T_1, T_2$, the first threshold element T'(1,1) of threshold array RAM 100 is changed to T'(1,1)=$T_0$, the second element T'(2,1) is changed to T'(2,1)=$T_1$, etc. The threshold for the second input pixel T(2,1) is then calculated as T(2,1)=$T_{start}$+T'(2,1)=$T_{start}$+$T_1$. This threshold $T_{S_2}$(2,1) is used to generate the second output pixel B(2,1). In response to the second output pixel B(2,1) new imprint amplitudes $U_i$ are generated at LUT 70. Assuming, for illustrative purposes, the threshold imprints $U_i=U_{-2}, U_{-1}, U_0, U_1, U_2$, and the threshold RAM 100 is changed by changing T'(1,1) to $T_{S_2}$'(1,1)=$T_0$+$U_{-1}$, T'(2,1) to T'(2,1)=$T_1$ +$U_0$, and T'(3,1) to T'(3,1)=$T_2$+$U_1$, etc. The new threshold for input pixel I(3,1) is then calculated as T(3,1)=$T_{start}$+T'(3,1).

After completion of the scan line threshold array RAM 100 is loaded with the initial thresholds for the new scanline. In a simple implementation, the new threshold values T'(n+1,i) are derived via T'(n+1, i)=D×T'(n,i). Note that the physical memory size for this operation needs only to encompass one scanline, making it possible for T'(n+1, i) and T'(n, i) to use the same RAM.

In an alternate implementation, the initial thresholds for the new scanline are formed as a weighted sum of the final thresholds of the previous scanline, T'(n+1,i)=T'(n,i)+aT'(n,i−1)+bT'(n,i+1)+...

While the particular embodiment passes only the output signal results between separations, it will no doubt be appreciated that the thresholds for each separation could be made a function of the thresholds for the other separations.

It will also be appreciated by those of skill in the art that changing the threshold against which the modified image signal is compared is completely equivalent to adding the threshold value to the modified signals, and comparing the modified signal to a fixed threshold. Such an arrangement is well within the scope of the invention.

It will no doubt be appreciated that the present invention may be accomplished with either software, hardware or combination software-hardware implementations.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A processing system for preparing a color document image described by image signals in plural separations each derived originally with a device describing image signals in each separation in terms of c levels, for output to an output device responding to output signals having d levels, where c>d>1 to print each separation comprising:

an image signal input, receiving separation image signals described in terms of said c levels;

an error diffusion circuit, having as signal inputs a received separation image signal and a variable reference signal, and producing for each received separation image signal an output signal described at one of said d levels, and directing halftoning error to at least one adjacent image signal in the same separation;

a variable reference signal generator including:

a source of amplitude signals, varying with at least one output signal from at least one other separation;

a source of imprint values defining a relationship between a set of reference signal modifications to be applied to the variable reference signals for each of a group of successive image signals in a single scan line;

a signal processor, combining an imprint value from the source of imprint values and an amplitude signal from said source of amplitude signals to generate an imprint signal therefor;

a reference signal memory, storing a set of reference signals for a previous scan line, updated by combining a stored reference signal and the imprint signal to generate a reference signal for the received separation image signal, and directing said reference signals to the error diffusion circuit.

2. A processing system for preparing a color image described by image signals in plural separations, derived originally with a device describing each image signal in terms of c levels, for output to an output device responding to output signals having d levels, where c>d>1 comprising:

an image generator, producing a plural set of input image signals, each set representing optical density at discrete points in a separation of the color image, said input image signals having magnitudes varying over c levels;

for each separation, an error diffusion circuit including:

a signal adder having as inputs one of the plural sets of input image signals, and modifying the input image signals with a previously determined error signal determined from processing a previous image signal, if any;

a threshold comparator comparing each modified input image signal with at least one reference signal to determine which of 'd' possible output image signals best represents the modified input signal;

an output storage register storing the determined output image signal;

a difference circuit determining the difference between the determined output image signal and the modified input image signal, and generating at least one error signal responsive indicative thereof; and a reference signal generator producing reference signals for each input image signal, including:

a) an intensity measurement circuit measuring intensity in an area including the input image signal, and producing an intensity measurement signal indicative of measured intensity;

b) an amplitude memory storing amplitude values and outputting said amplitude values responsive to measured density of a neighborhood of input signals, and at least one output signal from at least one other separation;

c) an imprint memory, storing a set of imprint values defining a relationship between a set of reference signal modifications to be applied to the reference signals for each of a group of successive image signals in a single scan line;

d) a signal processor, combining an imprint value from the imprint memory for the image signals and the amplitude value for the input image signal, to generate an imprint signal therefor;

a reference memory array, storing a set of reference signals for a previous scan line, updated by combining a stored reference signal and the imprint signal to generate a reference signal for the input image signal, and directing said reference signals to the threshold comparator;

a threshold decay signal processor reducing the value of the reference signal stored in the threshold memory array after it is used at the threshold comparator;

an output device, responsive to a plurality of said output image signals to reproduce a separation of the image in accordance therewith.

3. The device as defined in claim 2, wherein the amplitude value is additionally responsive to at least one previous output signal from the same separation.

4. The device as defined in claim 2, where the area over which the intensity measurement signal is derived includes only the pixel under operation.

5. The device as defined in claim 2, where said image signals are derived by a scanner, producing digital signals indicative of sensed reflected light from an illuminated sheet of image supporting material.

6. The device as defined in claim 2, where said output device is a printer, producing marks of a page of image supporting material responsive to receiving said output signals.

7. The device as defined in claim 2 wherein said intensity measurement circuit is operative over a plurality of image signals surrounding and including the image signal to be processed.

8. The device as defined in claim 2 wherein said amplitude memory is a lookup table stored in RAM memory.

9. The device as defined in claim 2 wherein said imprint memory is a lookup table stored in RAM memory.

10. The device as defined in claim 2 wherein said signal processor is a multiplier, receiving as inputs the imprint value and the amplitude value.

11. The device as defined in claim 2 wherein the threshold memory array, is updated by adding the imprint signal to a corresponding stored reference signal.

12. The device as defined in claim 2 wherein the threshold decay signal processor multiplied the value of the reference signal stored in the threshold memory array by a predetermined decay value after the completion of each scan line of processing, where decay value<1.

13. The device as defined in claim 2 wherein, for a new, unprocessed image, the reference signal is arbitrarily set to $T_{start}$ prior to the start of processing any image signals, and every location in the threshold memory array is set to zero.

14. The device as defined in claim 2 wherein the number of separations is greater than two.

15. A document processing system for preparing a color document derived originally with a device describing each signal in terms of c levels, for output to an output device responding to signals having d levels, comprising:

a document image creator, producing a plurality of sets of input image signals, each set representing optical density at discrete points in a separation of an image, said input image signals having magnitudes varying over said c levels;

means for adding a previously determined error signal derived by processing previous input image signals, if any, to said input image signal, whereby a modified input image signal is obtained;

means for comparing each modified input image signal with at least one reference signal to determine which of said d levels best represents the modified input signal and produce a printer output signals indicative thereof;

a printer, responsive to said printer output signals reproduce the document in accordance therewith;

means for determining a difference between one of said printer output signals and the modified input image signal, and generating at least one error signal indicative thereof;

means for producing said at least one reference signal for each input image signal, responsive to
  a) intensity measurement means measuring intensity in an area adjacent the input image signal, and producing an intensity measurement signal indicative of measured intensity;
  b) an amplitude memory storing amplitude values and outputting said amplitude values responsive to measured density of a neighborhood of input image signals, and at least one of the printer output signal from at least one other separation;
  c) an imprint memory means storing a set of imprint values defining a relationship between a set of reference signal modifications to be applied to the reference signals for each input image signal in a group of successive input image signals in a single scan line;
  d) a signal processor means combining an imprint value from the imprint memory for the input image signals and the amplitude value for the input image signal, to generate an imprint signal therefor;
  e) a threshold memory array means storing a set of said reference signals for a previous scan line, updated by combining a stored one of said reference signals and the imprint signal to generate said reference signal for the image image signal, and directing said reference signal to the threshold comparator;
  f) a threshold decay signal processor means reducing the value of the reference signal stored in the threshold old memory array after it is used at the threshold comparator, and prior to storage in the threshold memory array.

16. The device as defined in claim 15, wherein the amplitude value is additionally responsive to at least one previous output signal from the same separation.

17. The device as defined in claim 15, where the area over which the intensity measurement signal is derived includes only the pixel under operation.

18. The device as defined in claim 15, where said document image creator is a scanner producing image signals indicative of sensed reflected light from an illuminated sheet of image supporting material.

19. The device as defined in claim 15, wherein said intensity measurement means is operative over a plurality of image signals surrounding and including the image signal to be thresholded.

20. The device as defined in claim 15, wherein said amplitude memory means is a lookup table stored in RAM memory.

21. The device as defined in claim 15, wherein said imprint memory means is a lookup table stored in RAM memory.

22. The device as defined in claim 15, wherein said signal processor means is a multiplier, receiving as inputs the imprint value and the amplitude value.

23. The device as defined in claim 15, wherein the threshold memory array means, is updated by adding the imprint signal to a corresponding stored reference signal.

24. The device as defined in claim 15, wherein the threshold decay signal processor means multiplied the value of the reference signal stored in the threshold memory array means by a predetermined decay value after the completion of each scan line of processing, where decay value<1.

25. The device as defined in claim 15, wherein, for a new, unprocessed image, the reference signal is arbitrarily set to $T_{start}$ prior to the start of processing any image signals, and every location in the threshold memory array means is set to zero.

26. A method for preparing a color image derived originally with a device describing each image signal in terms of c levels, for output to an output device responding to output signals having d levels, where c>d>1 comprising:

producing a plural set of image signals, each set representing optical density at discrete points in a separation of the color image, said image signals having magnitudes varying over said c levels;

modifying each image signal in the image signal sets in accordance with a previously determined error signal derived by processing previous input signals in the same set, if any to generate modified image signals;

comparing each modified image signal with at least one reference signal to determine which of said d possible output signals best represents the modified input signal and producing an output signal indicative thereof;

directing said output signal to an output device to reproduce the image in accordance therewith;

determining a difference between the output signal and the modified input signal, and generating at least one error signal indicative thereof;

producing said reference signal for each image signal, by
  a) intensity measurement means measuring intensity in an area adjacent the image signal, and producing an intensity measurement signal indicative of measured intensity;
  b) storing a plurality of amplitude values, and outputting said amplitude values responsive to said intensity measurement signal, at least one previous output signal, if any and an output signal in at least one other separation;

c) storing a set of imprint values defining a relationship between a set of reference signal modifications to be applied to the reference signals for each of a group of successive image signals in a single scan line;

d) combining an imprint value from the imprint memory for the image signal and the amplitude value for the image signal, to generate an imprint signal therefor;

e) storing a set of reference signals for a previous scan line, updated by combining a stored reference signal and the imprint signal to generate a reference signal for the image signal, and directing said reference signals to the threshold comparator.

27. A processing system for preparing a color document image described by image signals in plural separations each derived originally with a device describing image signals in each separation in terms of c levels, for output to an output device responding to output signals having d levels, where c>d>1 to print each separation comprising:

an image signal input, receiving image signals described in terms of said c levels for a first separation;

an error diffusion circuit, having as signal inputs the received image signal for the first separation and a variable reference signal, and producing for each received image signal for the first separation an output signal at one of d levels for the first separation, and directing any halftoning error to at least one adjacent image signal in the first separation;

a variable reference signal generator receiving at least one output signal from at least one additional separation, and producing a threshold signal to the error diffusion circuit that is a function of the received output signal.

28. The system as described in claim 27, wherein said variable reference generator additionally receives at least one output signal from the first separation, and said threshold signal is additionally a function of said first separation output signal.

29. (amended) A processing system for preparing a color document image described by image signals in plural separations, each image signal derived originally with a device describing image signals in each separation in terms of c levels, for output to an output device responding to output signals having d levels, where c>d>1 to print each separation comprising:

an image signal input, receiving separation image signals described in terms of c levels;

an error diffusion circuit, having as signal inputs a received separation image signal and a variable reference signal, and producing for each received separation image signal an output signal described at one of d levels, and directing any halftoning error to at least one adjacent image signal in the same separation;

a variable reference signal generator including:

a source of amplitude signals, said amplitude signals varying with a) a measured density of a neighborhood of separation image signals, b) at least one previous output signal in the same separation, and c) at least one output signal from at least one other separation;

a source of imprint values defining a relationship between a set of reference signal modifications to be applied to the variable reference signals for each of a group of successive image signals in a single scan line;

a signal processor, combining an imprint value from the source of imprint values and the amplitude value to generate an imprint signal for said image signal;

a reference signal memory, storing a set of reference signals for a previous scan line, updated by combining a stored reference signal and the imprint signal to generate a reference signal for the image signal, and directing said updated reference signals to the error diffusion circuit as said variable reference value;

a reference decay signal processor reducing the value of the updated reference signal stored in the threshold memory array after said updated reference signal is directed to the error diffusion circuit.

* * * * *